United States Patent
Yeh et al.

(10) Patent No.: US 10,751,970 B2
(45) Date of Patent: Aug. 25, 2020

(54) THREE-DIMENSIONAL STRUCTURE

(71) Applicant: Industrial Technology Research Institute, Hsinchu (TW)

(72) Inventors: Jih-Hsiang Yeh, New Taipei (TW); Yu-Tsung Chiu, Taipei (TW); Shih-Ming Chen, Hsinchu (TW); Chih-Kang Peng, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 299 days.

(21) Appl. No.: 15/857,498

(22) Filed: Dec. 28, 2017

(65) Prior Publication Data

US 2019/0202163 A1    Jul. 4, 2019

(51) Int. Cl.
| | | |
|---|---|---|
| B32B 3/12 | (2006.01) | |
| B32B 3/08 | (2006.01) | |
| B32B 3/28 | (2006.01) | |
| B33Y 80/00 | (2015.01) | |

(52) U.S. Cl.
CPC ............... B32B 3/12 (2013.01); B32B 3/08 (2013.01); B32B 3/28 (2013.01); B33Y 80/00 (2014.12)

(58) Field of Classification Search
None
See application file for complete search history.

(56) References Cited

U.S. PATENT DOCUMENTS

| | | | |
|---|---|---|---|
| 8,579,018 B1 | 11/2013 | Roper et al. | |
| 2013/0344601 A1* | 12/2013 | Soman | A61L 27/14 435/396 |
| 2017/0058985 A1* | 3/2017 | Martino Gonzalez | F16F 7/00 |

FOREIGN PATENT DOCUMENTS

| | | |
|---|---|---|
| CN | 102891368 | 6/2015 |
| CN | 104763772 | 7/2015 |
| CN | 105856666 | 8/2016 |
| TW | M495365 | 2/2015 |
| TW | I501736 | 10/2015 |
| TW | M539528 | 4/2017 |

OTHER PUBLICATIONS

Machine Translation of CN 104763772 (translated Jan. 17, 2019) (Year: 2015).*
Lira et la.; A gradient Cellular Core for Aeroengine Fan Blades Based on Auxetic Configurations; Journal of Intelligent Materials Systems and Structures; vol. 22 (2011), pp. 907-917 (Year: 2011).*
"Office Action of Taiwan Counterpart Application," dated Aug. 27, 2018, pp. 1-10.
Y. Hou, et al., "Graded conventional-auxetic Kirigami sandwich structures: Flatwise compression and edgewise loading," Composites: Part B, vol. 59, Mar. 2014, pp. 33-42.

* cited by examiner

*Primary Examiner* — David Sample
*Assistant Examiner* — Elizabeth Collister
(74) *Attorney, Agent, or Firm* — JCIPRNET (57) ABSTRACT

A three-dimensional structure includes a plate and a three-dimensional component disposed on the plate. The three-dimensional component contains at least one first structure and at least one second structure. The first structure is an auxetic structure, and the second structure is different from the first structure. The at least one first structure and the at least one second structure are provided layer by layer along a thickness direction of the plate on the plate.

15 Claims, 11 Drawing Sheets

THREE-DIMENSIONAL STRUCTURE

TECHNICAL FIELD

This disclosure is related to a three-dimensional structure.

BACKGROUND

With the rapid development in science and technology, the 3D printing technology, derived from the industrial manufacturing, has gradually come into life at present. Unlike the traditional material-removing subtractive process, 3D printing is an additive manufacturing that can produce a structure having a complex morphology and holes, as well as has many production advantages of small amount, diversity, and high value. Therefore, 3D printing technology in the future can be applied to the developments of protective gear, aerospace, automotive components, 3C shell parts, medical materials, and creative products with complex structure.

SUMMARY

This disclosure provides a three-dimensional structure to achieve the effects of lightweight and excellent protection against impact.

A three-dimensional structure of the disclosure includes a first plate and a three-dimensional component disposed on the first plate. The three-dimensional component comprises at least one first structure, and at least one second structure. The first structure is an auxetic structure, and the second structure is different from the first structure. The at least one first structure and the at least one second structure are provided on the first plate layer by layer along a thickness direction of the first plate.

In light of the foregoing, two three-dimensional components of different types are mixed to form a three-dimensional structure in the disclosure, thereby achieving the lightweight effect, and the stress concentration phenomenon may be reduced when the three-dimensional structure is impacted by external forces to achieve protective effects.

To make the above features of the disclosure more comprehensible and obvious, the embodiments are described below in detail with reference to the accompanying drawings.

DESCRIPTION OF THE EMBODIMENTS

Reference is made to the following examples and accompanying drawings for a more complete understanding of the disclosure, but the disclosure may be practiced in many different forms and should not be construed as limited to the embodiments set forth herein. For ease of understanding, the same elements in the following description will be denoted by the same reference numerals. In the drawings, for the sake of clarity, the components and their relative sizes may not be drawn to scale.

Figure 1:
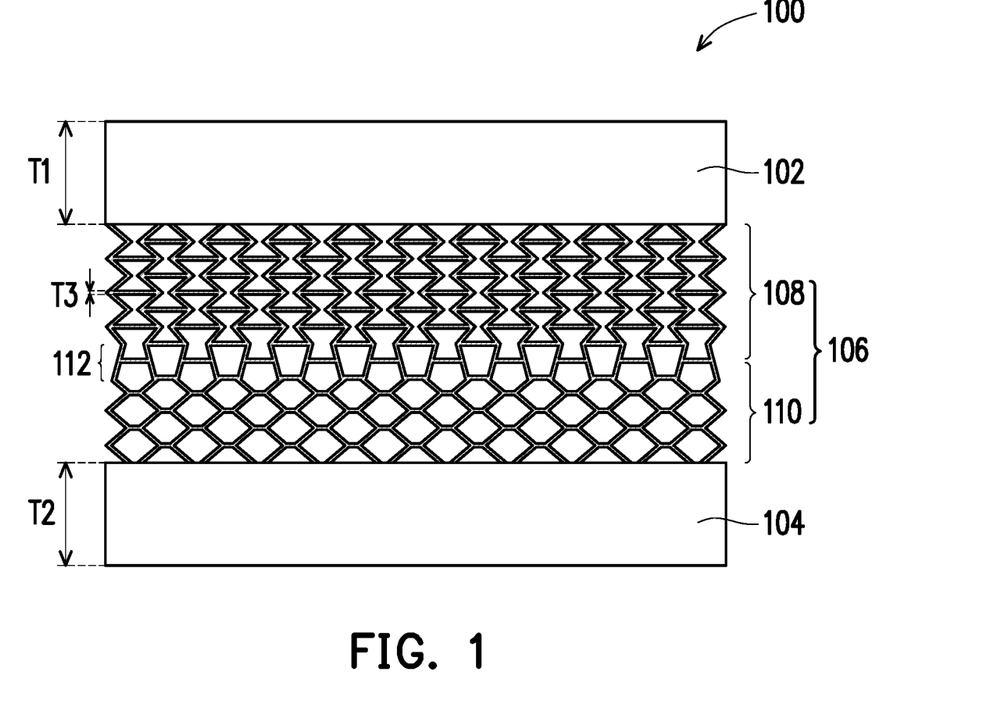
FIG. 1 is a cross-sectional view of a three-dimensional structure according to an embodiment.

FIG. 1 is a cross-sectional view of a three-dimensional structure according to an embodiment.

Please refer to FIG. 1. The three-dimensional structure 100 of the present embodiment includes a first plate 102, a second plate 104 and a three-dimensional component 106. The three-dimensional component 106 is interposed between the first plate 102 and the second plate 104. However, the disclosure is not limited thereto, and the three-dimensional structure 100 may not have the second plate 104 as well. The three-dimensional component 106 includes at least one first structure 108 and at least one second structure 110. The first structure 108 and the second structure 110 are provided layer by layer on the first plate 102 along a thickness direction (T1) of the first plate 102. In other words, the first plate 102 only contacts the first structure 108 or the second structure 110, and each layer of the three-dimensional component 106 is either a first structure 108 or a second structure 110, respectively. The first structure 108 is an auxetic structure, and the second structure 110 is different from the first structure 108. The second structure 110 may be a honeycomb structure, for example. Moreover, the three-dimensional component 106 of the present embodiment may further have a gradient structure 112 between the first structure 108 and the second structure 110. In other words, each layer of the three-dimensional component 106 is the first structure 108, the second structure 110, or the gradient structure 112, respectively. The gradient structure 112 refers to an intermediate structure that is gradually changed from the first structure 108 to the second structure 110 or from the second structure 110 to the first structure 108, according to a predetermined gradient. Taken the second structure 110 being a honeycomb structure as an example, the gradient structure 112 is a ladder structure.

Figure 2:
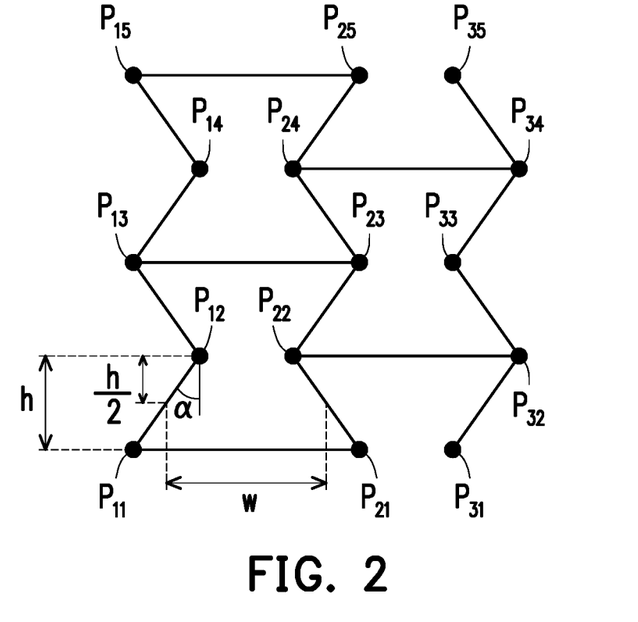
FIG. 2 is a schematic line-shaped diagram of an auxetic structure.

In the present embodiment, the so-called "auxetic structure" is represented by the end points P11 to P35 and the lines between the end points in FIG. 2. Therefore, it is necessary for $P_{i,j}$ $(x_i, y_j)$ to comply with the following equations (1) to (5).

$$x_i = \begin{cases} i \cdot w - s_j, & \text{if } i \text{ is an odd number} \\ i \cdot w + s_j, & \text{if } i \text{ is an even number} \end{cases} \quad \text{equation (1)}$$

$$y_j = j \cdot h \quad \text{equation (2)}$$

$$s_j = \frac{h}{2} \cdot \tan \alpha_j \quad \text{equation (3)}$$

$$\alpha_j = \begin{cases} \alpha_j = \alpha_0, & \text{if } j \leq N \\ \alpha_j = \alpha_0 - (j - N) \cdot \Delta \alpha, & \text{if } N \leq j \leq N + M \\ \alpha_j = -\alpha_0, & \text{if } N + M \leq j \end{cases} \quad \text{equation (4)}$$

$$\Delta \alpha = \frac{2\alpha_0}{M} \quad \text{equation (5)}$$

All of the i, j, N, and M are integers in equations (1) to (5).

Then, the lines between each end point $P_{i,j}$ ($x_i$, $y_j$) in FIG. 2 is determined according to the following conditions: If the lines are between $P_{i,j} \leftrightarrow P_{1,j+1}$, it is applied to all i and j. If the lines are between $P_{i,j} \leftrightarrow P_{i+1,j}$, it is applied to that i is odd and j is even or that i is even and j is odd.

In FIG. 1, the thickness T1 of the first plate 102 is, for example, 5 times to 20 times the wall thickness T3 of the three-dimensional component 106, and the thickness T2 of the second plate 104 is, for example, 5 times to 20 times the wall thickness T3 of the three-dimensional component 106. The term "wall thickness" in the text means the thickness of the structural wall of the first structure 108 and/or the second structure 110 in the three-dimensional component 106. For example, if the wall thickness T3 of the three-dimensional component 106 is between 0.1 mm and 10 mm, the thickness T1 or the thickness T2 may be between 0.5 mm and 200 mm. In addition, the first plate 102 or the second plate 104 may each have a predetermined curvature, so as to make different sizes of plates, sheets, round tubes, square tubes, special-shaped tubes, round solid rods, square solid bars, and so on, so that the stereoscopic three-dimensional component 106 is contained in the entire three-dimensional structure 100. Moreover, in the present embodiment, the first plate 102, the second plate 104 and the three-dimensional component 106 may be an integrated structure made by 3D printing. Therefore, the materials of the first plate 102, the second plate 104 and the three-dimensional component 106 may be the same, but the disclosure is not limited thereto. In an embodiment, the material of the first plate 102 is, for example, a metal, a polymer material (such as a thermoplastic material, a thermoset material or an elastomer), or a composite material; the material of the second plate 104 is, for example, a metal, a polymer material (such as a thermoplastic material, a thermosetting material or an elastomer), or a composite material; the material of the three-dimensional component 106 is, for example, a metal, a polymer material (such as a thermoplastic material, a thermosetting material or an elastomer), or a composite material.

In the present embodiment, the period of the three-dimensional component 106 is, for example, 3 to 20. The so-called "period" refers to the number of structural units that repeat in the thickness direction of the three-dimensional structure 100. From FIG. 1, the period of the first structure 108 in the three-dimensional component 106 is three, and the period of the second structure 110 is three. Therefore, the period of the three-dimensional component 106 in FIG. 1 is six. The gradient structure 112 is the transition from the first structure 108 to the second structure 110, hence it is not counted within the period of the three-dimensional component 106. However, the disclosure is not limited to this. For the sake of light weight, the period of the first structure 108 is, for example, two to seven. The period of the second structure 110 is, for example, two to seven. In addition, the first structure 108 and the second structure 110 may also be alternately arranged in multiple layers, and the required structure layer arrangement will depend on the external force taken by the product. It may be determined through computer simulation or physical test methods, and use 3D printing method for processing. In this embodiment, the three-dimensional component 106 is formed by a first structure 108, a gradient structure 112 and a second structure 110, but the disclosure is not limited thereto.

Figure 3:
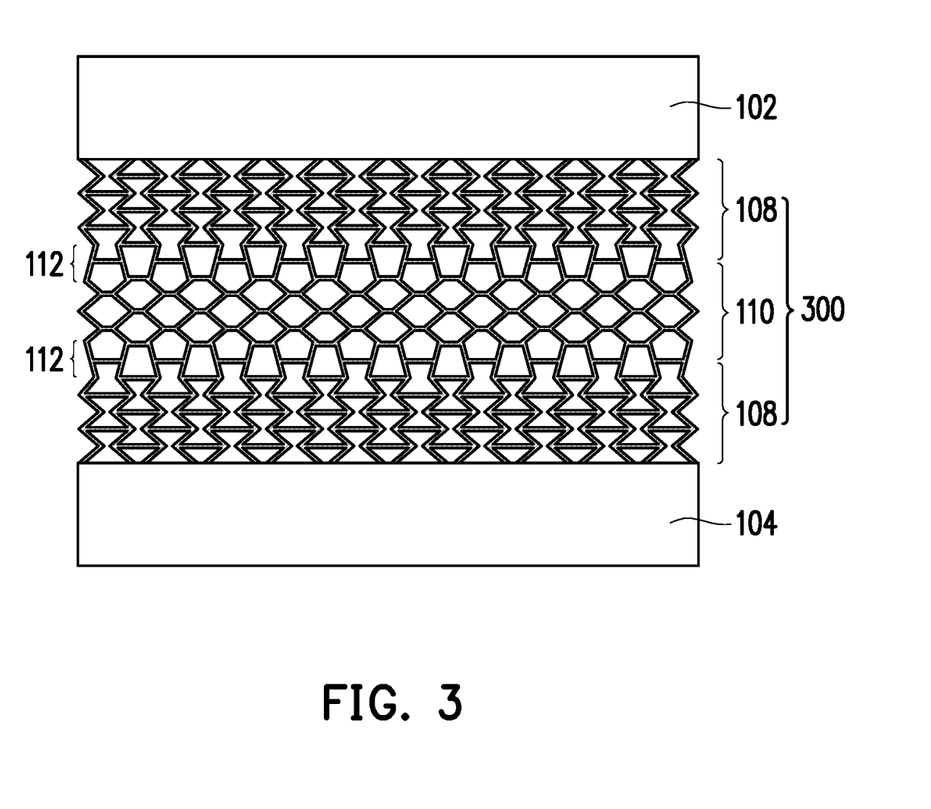
FIG. 3 is a cross-sectional view of a three-dimensional structure according to another embodiment.

In another embodiment, the three-dimensional component 300 may be formed by two first structures 108, two gradient structures 112, and one second structure 110, and the second structure 110 is between the two first structures 108. One gradient structure 112 is interposed between one of the first structures 108 and the second structure 110, and the other gradient structure 112 is interposed between the other one of the first structure 108 and the second structure 110, as shown in FIG. 3. From FIG. 3, the period of the single first structure 108 in the three-dimensional component 300 is three, and the period of the second structure 110 is three. Therefore, the period of the three-dimensional component 300 in FIG. 3 is nine.

Figure 4:
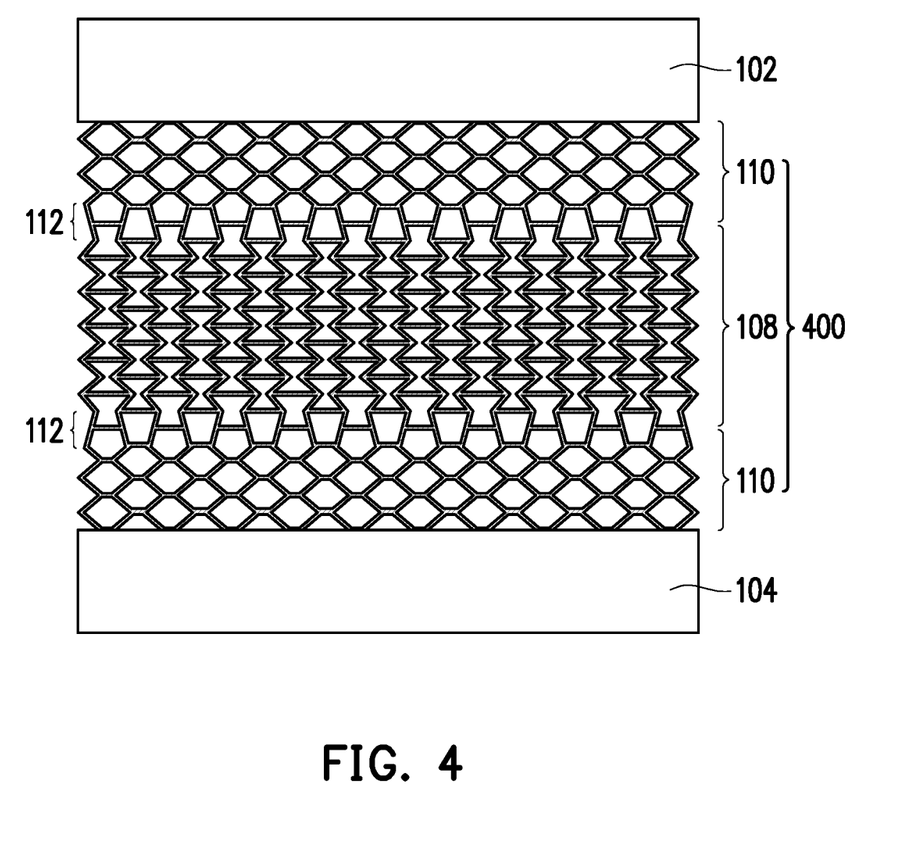
FIG. 4 is a cross-sectional view of a three-dimensional structure according to yet another embodiment.

In still another embodiment, the three-dimensional component 400 may be formed by two second structures 110, two gradient structures 112 and one first structure 108, and the first structure 108 is interposed between the two second structures 110. One of the gradient structures 112 is interposed between one of the second structures 110 and the first structure 108, and the other gradient structures 112 is interposed between the other one of the second structures 110 and the first structure 108, as shown in FIG. 4. Referring to FIG. 4, the period of the first structure 108 in the three-dimensional component 400 is five, and the period of the single second structure 110 is three. Therefore, the period of the three-dimensional component 400 in FIG. 4 is eleven.

The following is a few simulation experiments to verify the efficacy of the disclosure, but the disclosure is not limited to the following.

Simulation conditions:
w=3 mm;
h=√3/2 mm;
$\alpha_0$=−50°, M=2;
Wall thickness (T3)=0.3 mm;
Circle diameter=20 mm, specific weight is 1;
Speed=10000 mm/sec.

Comparative Simulation Example 1

Figure 5A:
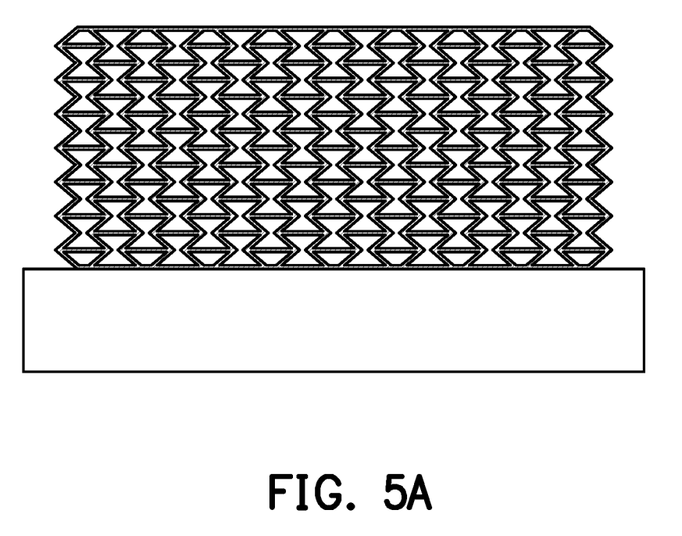
FIG. 5A is a schematic diagram of Comparative Simulation Example 1 of a fully auxetic structure.

To simulate a fully auxetic structure as shown in FIG. 5A, the period thereof is seven. Then, the maximum stress of the protected object in the impact process is calculated by using computer simulation. The simulated impact direction is the thickness direction from top to bottom. The result is shown in FIG. 6.

Comparative Simulation Example 2

Figure 5B:
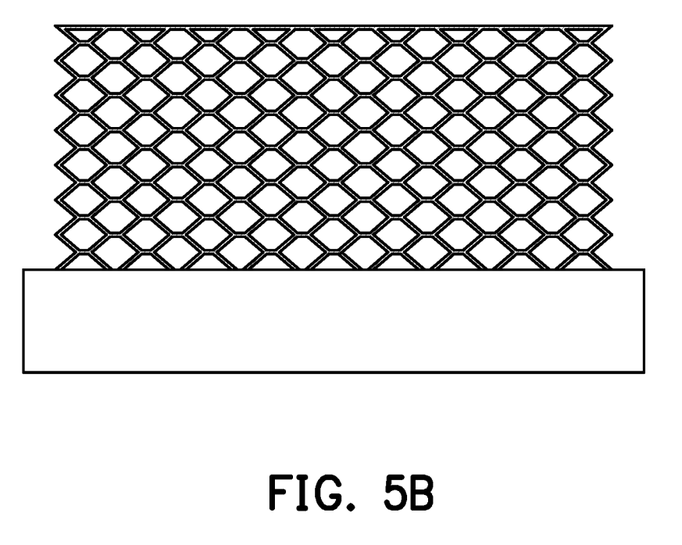
FIG. 5B is a schematic diagram of Comparative Simulation Example 2 of a full honeycomb structure.

To simulate a full honeycomb structure as shown in FIG. 5B, the period thereof is also seven. Then, the maximum stress of the protected object in the impact process is calculated by using computer simulation. The simulated impact direction is the thickness direction from top to bottom. The result is also shown in FIG. 6.

Figure 6:
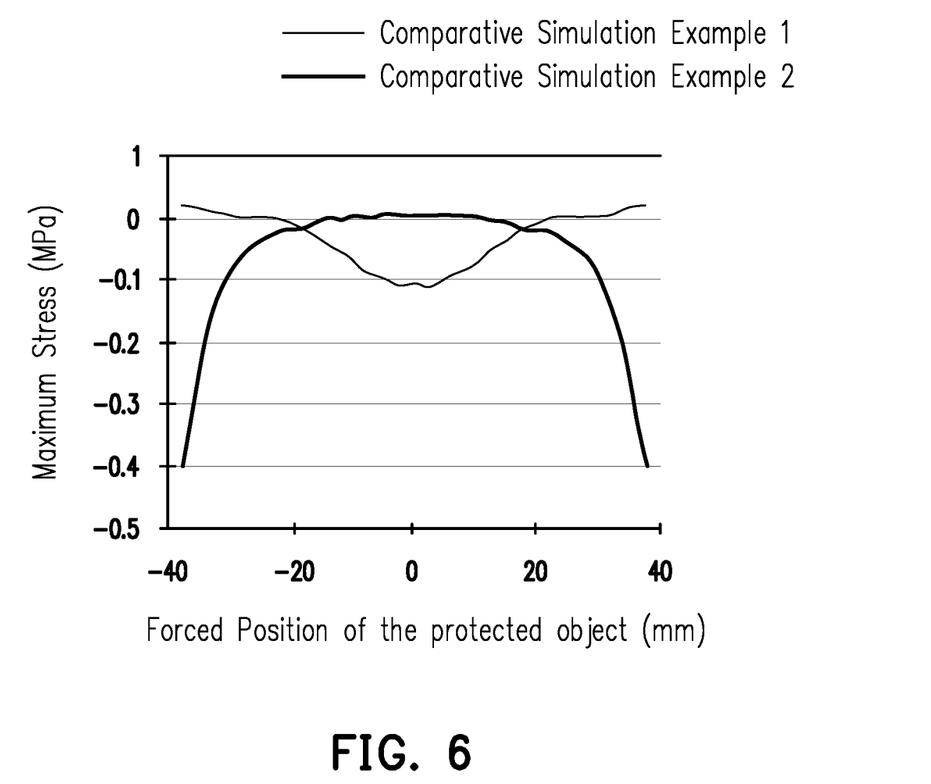
FIG. 6 is a stress curve diagram of Comparative Simulation Example 1 and Comparative Simulation Example 2.

From FIG. 6, it could be obtained that the object protected by the three-dimensional structure with the full honeycomb structure is over-stressed on both sides. The object protected by the three-dimensional structure with the fully auxetic structure sustains a more uniform force, but there is still room for improvement.

Simulation Example 1

Figure 7A:
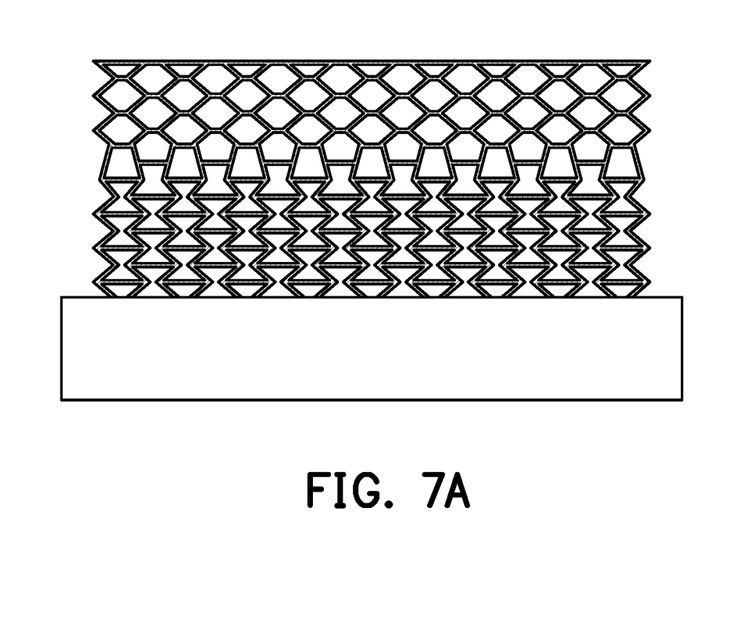
FIG. 7A is a three-dimensional schematic view of Simulation Example 1.

A three-dimensional component as shown in FIG. 7A is simulated. In the three-dimensional component, the period of the honeycomb structure in the upper part is three, and the period of the auxetic structure in the lower part is four. The simulated impact direction is the thickness direction from top to bottom. The result is shown in FIG. 8.

Simulation Example 2

Figure 7B:
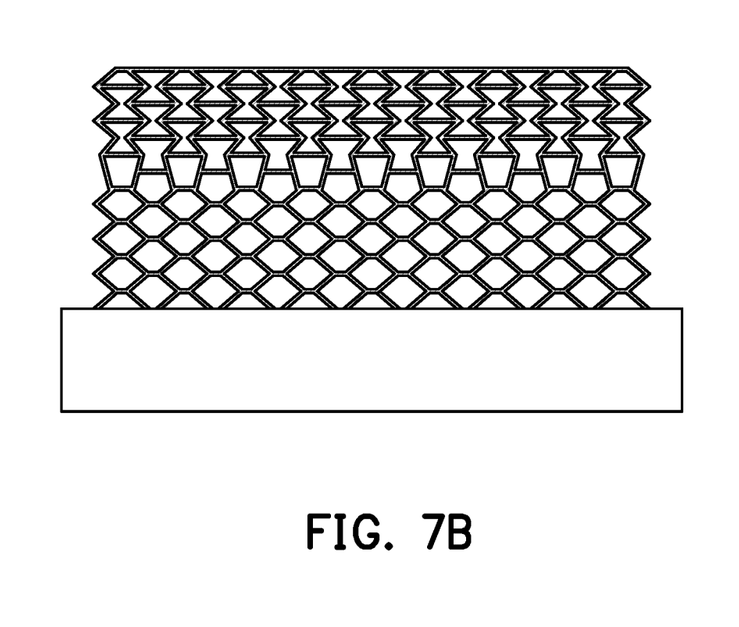
FIG. 7B is a three-dimensional schematic diagram of Simulation Example 2.

A three-dimensional component as shown in FIG. 7B is simulated. In the three-dimensional component, the period of the auxetic structure in the upper part is three, and the period of the honeycomb structure in the lower part is four. The simulated impact direction is the thickness direction from top to bottom. The result is shown in FIG. 8.

Figure 8:
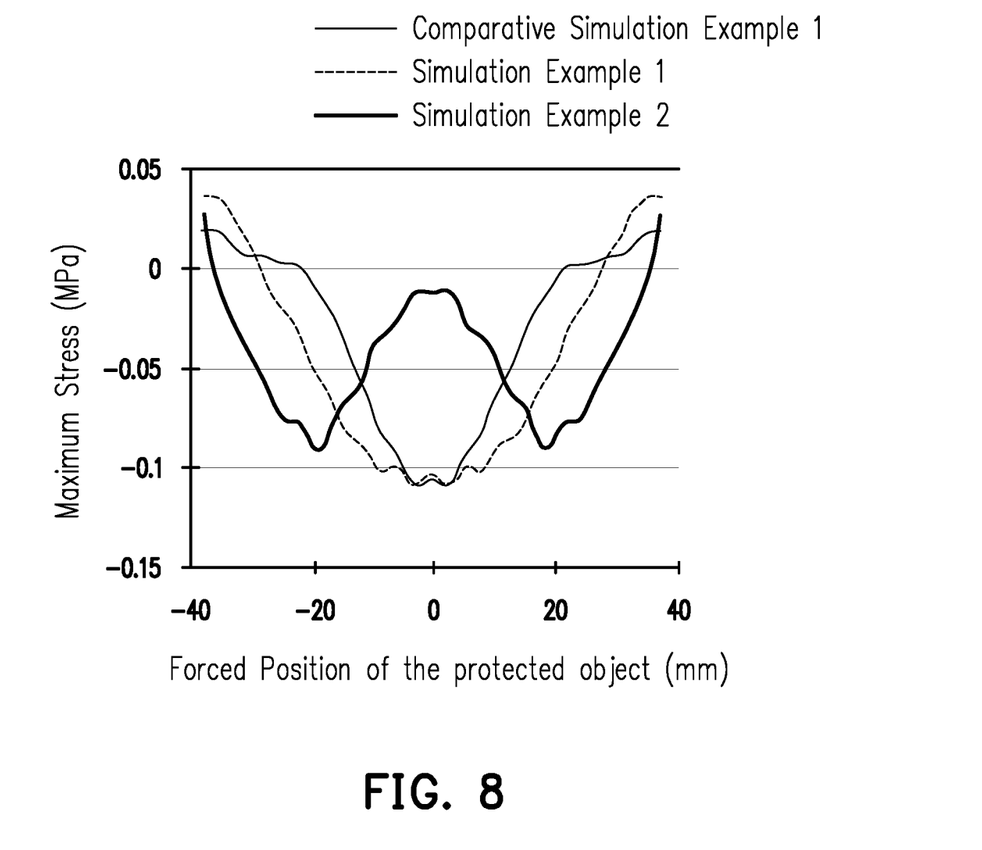
FIG. 8 is a stress curve diagram of Comparative Simulation Example 1, Simulation Example 1 and Simulation Example 2.

In addition, the result of the Comparative Simulation Example 1 is also shown in FIG. 8. Therefore, from FIG. 8, the Simulation Examples 1 and 2 are superior to the Comparative Simulation Example 1 in the evenness of the force taken. Moreover, the maximum stress (absolute value) of the Simulation Example 2 is the lowest, so the structure of the Simulation Example 2 is preferable.

Simulation Example 3

Figure 9A:
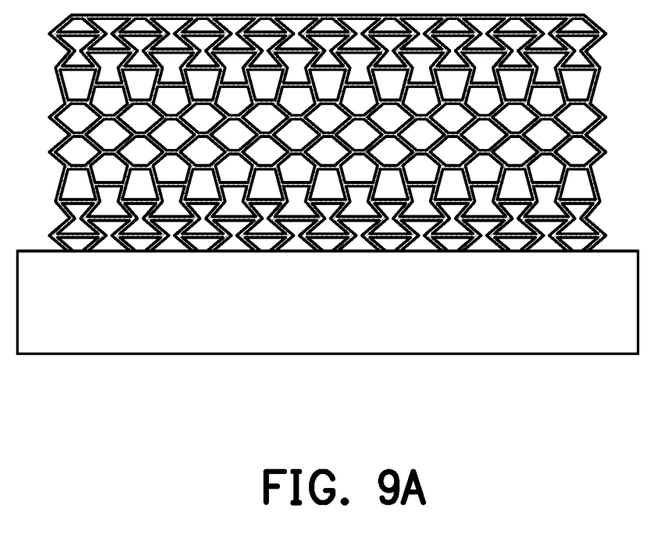
FIG. 9A is a three-dimensional schematic diagram of Simulation Example 3.

A three-dimensional component as shown in FIG. 9A is simulated. In the three-dimensional component, the period of the auxetic structure in the upper part and the lower part is two for each part, and the period of the honeycomb structure in the middle part is three. The simulated impact direction is the thickness direction from top to bottom. The result is shown in FIG. 10.

Simulation Example 4

Figure 9B:
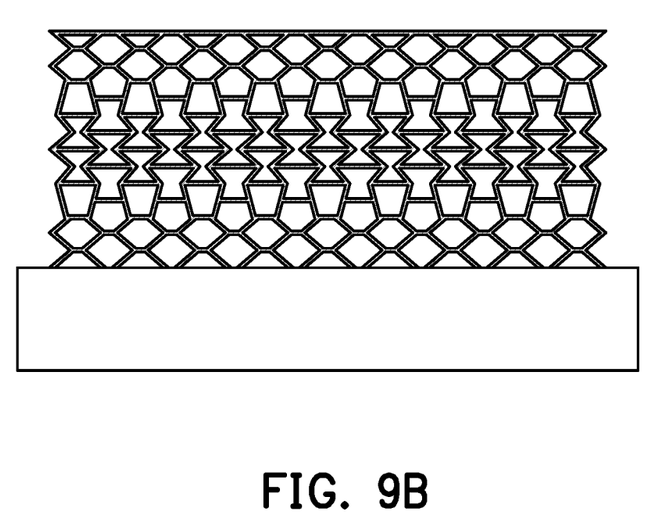
FIG. 9B is a three-dimensional schematic diagram of Simulation Example 4.

A three-dimensional component as shown in FIG. 9B is simulated. In the three-dimensional component, the period of the honeycomb structure in the upper part and the lower part is two for each part, and the period of the auxetic structure in the middle part is three. The simulated impact direction is the thickness direction from top to bottom. The result is shown in FIG. 10.

Figure 10:
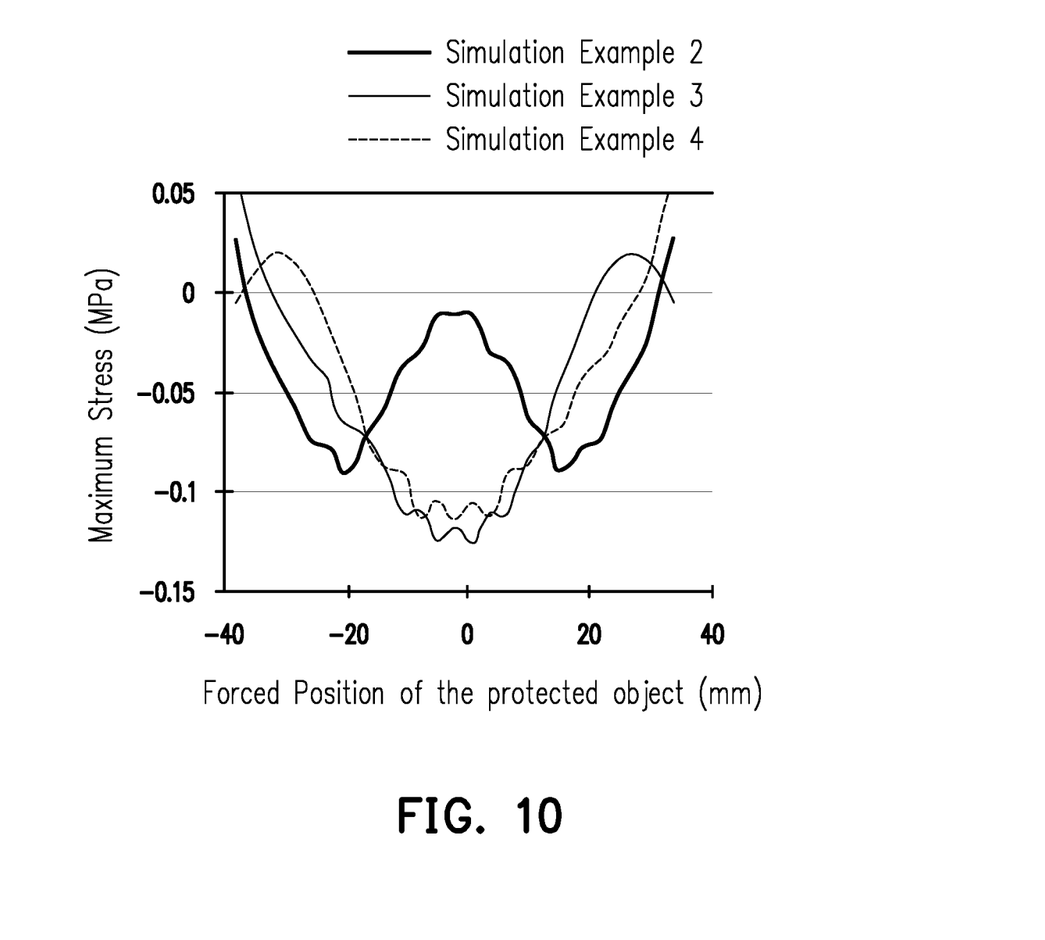
FIG. 10 is a stress curve diagram of Simulation Examples 2-4.

In addition, the result of the Simulation Example 2 is also shown in FIG. 10. Therefore, from FIG. 10, the sustained force modes of the Simulation Examples 3 and 4 are more similar.

Simulation Example 5

Figure 11A:
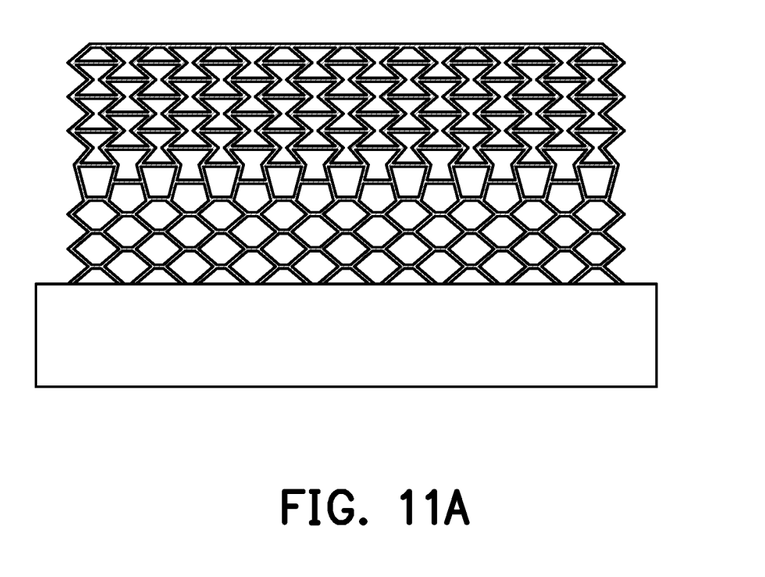
FIG. 11A is a three-dimensional schematic diagram of Simulation Example 5.

A three-dimensional component as shown in FIG. 11A is simulated. In the three-dimensional component, the period of the auxetic structure in the upper part is four, and the period of the honeycomb structure in the lower part is three. The simulated impact direction is the thickness direction from top to bottom. The result is shown in FIG. 12.

Simulation Example 6

Figure 11B:
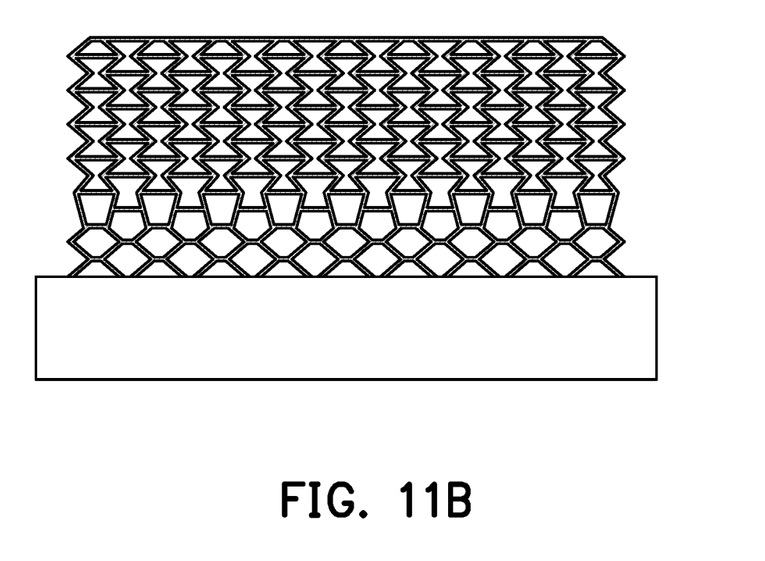
FIG. 11B is a three-dimensional schematic diagram of Simulation Example 6.

A three-dimensional component as shown in FIG. 11B is simulated. In the three-dimensional component, the period of the auxetic structure in the upper part is five, and the period of the honeycomb structure in the lower part is two. The simulated impact direction is the thickness direction from top to bottom. The result is shown in FIG. 12.

Figure 12:
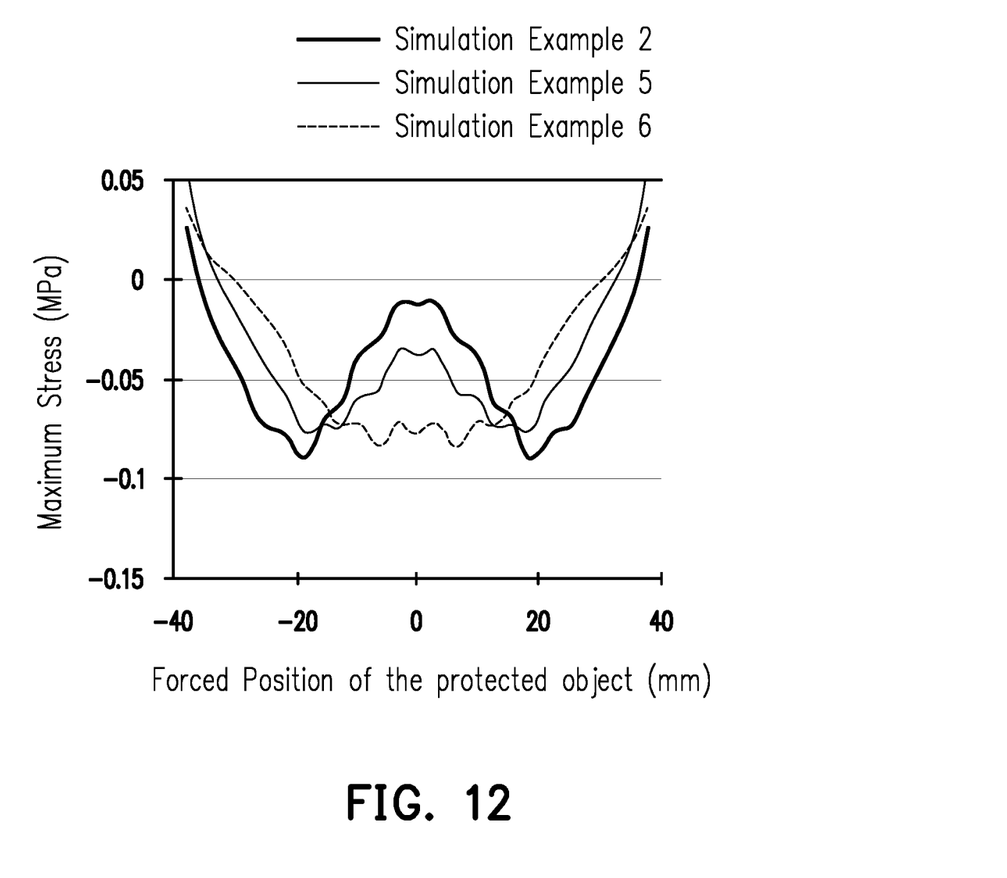
FIG. 12 is a stress curve diagram of Simulation Examples 2, 5, and 6.

In addition, the result of the Simulation Example 2 is also shown in FIG. 12. Therefore, as can be seen from FIG. 12, the result of the Simulation Example 5 is the best considering the maximum stress value. As for the uniformity of sustained force, the Simulation Example 6 has the best result.

In light of the foregoing, the three-dimensional structure formed by mixing an auxetic structure with another different type of structure can achieve a three-dimensional structure with reduced weight and less stress concentration when impacted by an external force. Moreover, the three-dimensional structure of the disclosure can reduce the weight by 20% to 50% and improve the impact resistance by 40% as compared with the conventional three-dimensional structure which has only a single structure type (such as a honeycomb structure), and can also achieve the protection function.

While the disclosure has been described by way of embodiments above, it is to be understood that the disclosure is not limited thereto. Anyone with ordinary skill in the art may make some changes and modifications without departing from the spirit and scope of the disclosure. Therefore, the protection scope of the disclosure shall be determined by the scope of the appended claims.

What is claimed is:
1. A three-dimensional structure, comprising:
a first plate; and
a three-dimensional component disposed on the first plate, wherein the three-dimensional component comprises at least one first structure, at least one second structure, and a gradient structure interposed between the at least one first structure and the at least one second structure, wherein the first structure is an auxetic structure, the second structure is a honeycomb structure, the at least one first structure, the gradient structure, and the at least one second structure are provided on the first plate layer by layer along a thickness direction of the first plate, and
the gradient structure is an intermediate structure that is gradually changed from the at least one first structure to the at least one second structure or from the at least one second structure to the at least one first structure, according to a predetermined gradient, wherein each of end points $P_{i,j}(x_i, y_j)$ of the auxetic structure complies with the following equations (1) to (5)

$$x_i = \begin{cases} i \cdot w - s_j, & \text{if } i \text{ is an odd number} \\ i \cdot w + s_j, & \text{if } i \text{ is an even number} \end{cases} \quad \text{equation (1)}$$

$$y_i = j \cdot h \quad \text{equation (2)}$$

$$s_j = \frac{h}{2} \cdot \tan \alpha_j \quad \text{equation (3)}$$

$$\alpha_j = \begin{cases} \alpha_j = \alpha_0, & \text{if } j \leq N \\ \alpha_j = \alpha_0 - (j-N) \cdot \Delta\alpha, & \text{if } N \leq j \leq N+M \\ \alpha_j = -\alpha_0, & \text{if } N+M \leq j \end{cases} \quad \text{equation (4)}$$

$$\Delta\alpha = \frac{2\alpha_0}{M} \quad \text{equation (5)}$$

all of the i, j, N, and M are integers in equations (1) to (5).

2. The three-dimensional structure of claim 1, wherein a wall thickness of the three-dimensional component is between 0.1 mm and 10 mm.

3. The three-dimensional structure of claim 1, wherein a thickness of the first plate is 5 to 20 times a wall thickness of the three-dimensional component.

4. The three-dimensional structure of claim 1, wherein a period of the three-dimensional component is 3 to 20.

5. The three-dimensional structure of claim 4, wherein a period of the first structure of the three-dimensional component is 2 to 7.

6. The three-dimensional structure of claim 4, wherein a period of the second structure of the three-dimensional component is 2 to 7.

7. The three-dimensional structure of claim 1, wherein the three-dimensional component is formed by two of the at least one first structure, two of the gradient structure, and the at least one second structure, the second structure is between the two first structures, one of the gradient structures is interposed between one of the first structures and the second structure, and the other one of the gradient structures is interposed between the other one of the first structures and the second structure.

8. The three-dimensional structure of claim 1, wherein the three-dimensional component is formed by one of the at least one first structure, two of the gradient structure, and two of the at least one second structure, the first structure is between the two second structures, one of the gradient structures is interposed between one of the second structures and the first structure, and the other one of the gradient structures is interposed between the other one of the second structures and the first structure.

9. The three-dimensional structure of claim 1, wherein the first plate has a predetermined curvature.

10. The three-dimensional structure of claim 1, wherein a material of the first plate and the three-dimensional component comprises a metal, a polymer material or a composite material.

11. The three-dimensional structure of claim 10, wherein the polymer material comprises a thermoplastic material, a thermosetting material or an elastomer.

12. The three-dimensional structure of claim 1, wherein the first plate and the three-dimensional component are an integrated structure made by 3D printing.

13. The three-dimensional structure of claim 1, further comprising a second plate, wherein the three-dimensional component is interposed between the first plate and the second plate.

14. The three-dimensional structure of claim 13, wherein a thickness of the second plate is 5 to 20 times a wall thickness of the three-dimensional component.

15. The three-dimensional structure of claim 13, wherein the second plate has a predetermined curvature.

* * * * *